United States Patent [19]
Norris et al.

[11] 3,964,639
[45] June 22, 1976

[54] SEED TUBE DIFFUSER FOR A PNEUMATIC SEED PLANTER

[75] Inventors: A. Lowell Norris, Downers Grove; Darlo E. Lienemann, Darien, both of Ill.

[73] Assignee: International Harvester Company, Chicago, Ill.

[22] Filed: Feb. 5, 1975

[21] Appl. No.: 547,314

[52] U.S. Cl. ............................................... 221/278
[51] Int. Cl.² ........................................ B65G 53/58
[58] Field of Search ............ 221/278, 211; 302/64; 243/23; 111/77, 78; 222/193

[56] References Cited
UNITED STATES PATENTS

| | | | |
|---|---|---|---|
| 685,824 | 11/1901 | Cowley | 243/23 |
| 711,367 | 10/1902 | Taisey | 243/23 |
| 933,527 | 9/1909 | Brown | 243/23 |
| 992,784 | 5/1911 | Litchfield | 243/25 |
| 1,637,834 | 8/1927 | Oliver | 111/77 X |
| 3,028,625 | 4/1962 | Dawson | 222/193 X |
| 3,240,175 | 3/1966 | Clow | 221/211 X |
| 3,380,626 | 4/1968 | Giannini | 221/211 X |
| 3,891,120 | 6/1975 | Loesch | 221/278 X |

Primary Examiner—Stanley H. Tollberg
Attorney, Agent, or Firm—Raymond E. Parks; Floyd B. Harman

[57] ABSTRACT

An air diffuses for use in a seed delivery tube of a pneumatic type of seed planter. This air diffuser is a short length of pipe which is perforated with a plurality of holes. The effective open area of the holes being approximately fifty-percent greater than the open area within the pipe taken on a cross-section of the pipe at the location of the holes. The air diffuser is spliced into the tube at a determinant length from the seed discharge end of the tube. It helps to maintain a uniform spacing of seed planted in the ground by preventing the buildup of back pressure upstream from the seed discharge end of the tube. If back pressure is permitted to build up in the tube, it will change the velocity of the seed traveling through the tube and effect the spacing of the seed planted in the ground.

8 Claims, 4 Drawing Figures

SEED TUBE DIFFUSER FOR A PNEUMATIC SEED PLANTER

CROSS-REFERENCES TO RELATED ART

United States Patents
a) 3,637,108    Loesch et al    January 25, 1972
b) 3,731,842    Schlogel    May 8, 1973
c) 3,757,996    Lienemann et al    September 11, 1973
d) 3,762,603    Bauman    October 2, 1973
e) 3,779,428    Bauman    December 18, 1973
f) 3,848,552    Bauman et al    November 19, 1974
g) Application Serial No. 377,478    Bauman et al    Filed July 9, 1973

Foreign Patents
h) Australian Patent No. 438,373 published December 18, 1973 (Claims priority of United States Patent Application Serial No. 146,258, filed on May 24, 1971 by Lienemann).

SUMMARY OF THE INVENTION

This invention relates to a seed tube air diffuser which is installed in the row unit seed tubes of a pneumatic planter. The air diffuser aids in relieving the buildup of back pressure within the seed tube and provides for continuous air flow through the seed tube in the event the air flow is supressed at the lower discharge end of the seed tube due to soil flow along the furrow or ground opener. When the air flow through the seed tube is restricted, seed spacing accuracy of the seed deposited in the ground is effected. The air diffuser by allowing continuous and uniform air flow permits a more uniform seed spacing and prevents clogging of the seed tube by a buildup of seeds within the seed tube due to back pressure.

The air diffuser is a short cylindrical duct member which is spliced into or installed in the seed delivery tube, at a predetermined length from the discharge end. In the body of the member there is provided a plurality of holes; the effective open area of which being approximately fifty-percent greater than the open area within the duct taken on a cross-section of the duct at the location of the holes. These holes permit the discharge of a slight amount of air as a normal minimal back pressure is created in the lower discharge end of the seed delivery tube by the flow of soil around the furrow or ground opener. If the air flow is seriously restricted as a result of blockage around the discharge end and furrow opener, the diffuser will permit a larger amount of air to be discharged through the holes reducing the back pressure and thus maintaining a substantially uniform spacing of seed downstream of the diffuser.

DESCRIPTION OF THE INVENTION

Figure 4:
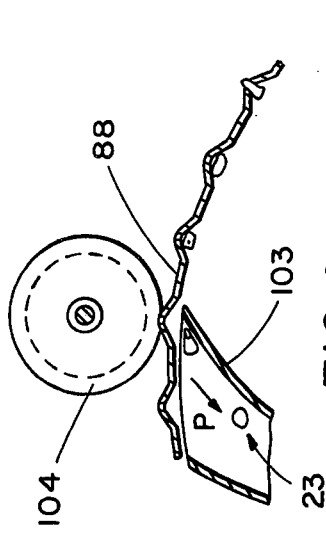
FIG. 4 is a representation of the seed intake end of a seed delivery tube.
Figure 2:
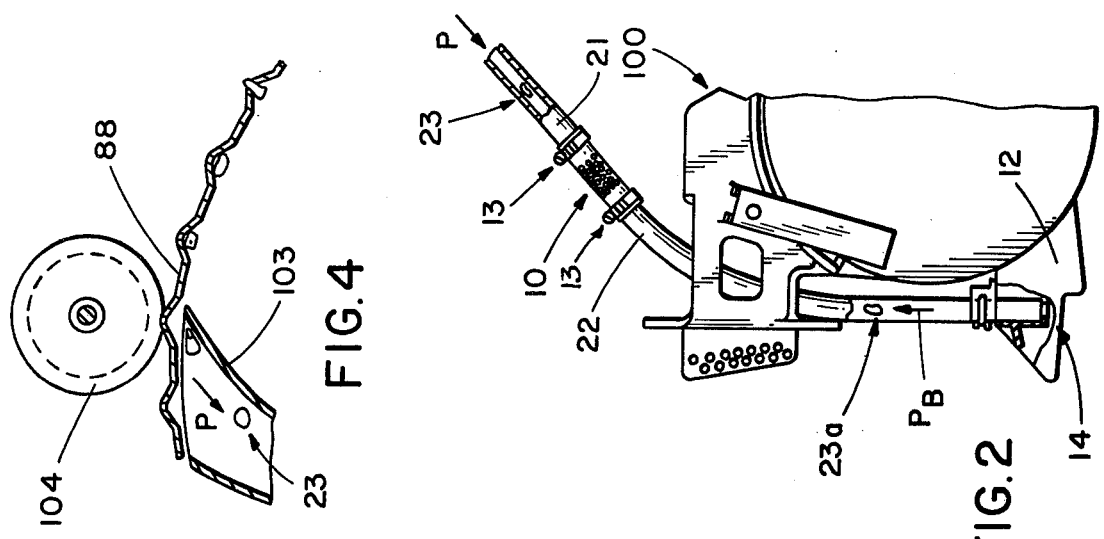
FIG. 2 is a partial side view showing a seed furrow opener at the discharge end of a delivery tube with an air diffuser spliced into the tube at a determinant length above the discharge end and furrow opener.
Figure 1:
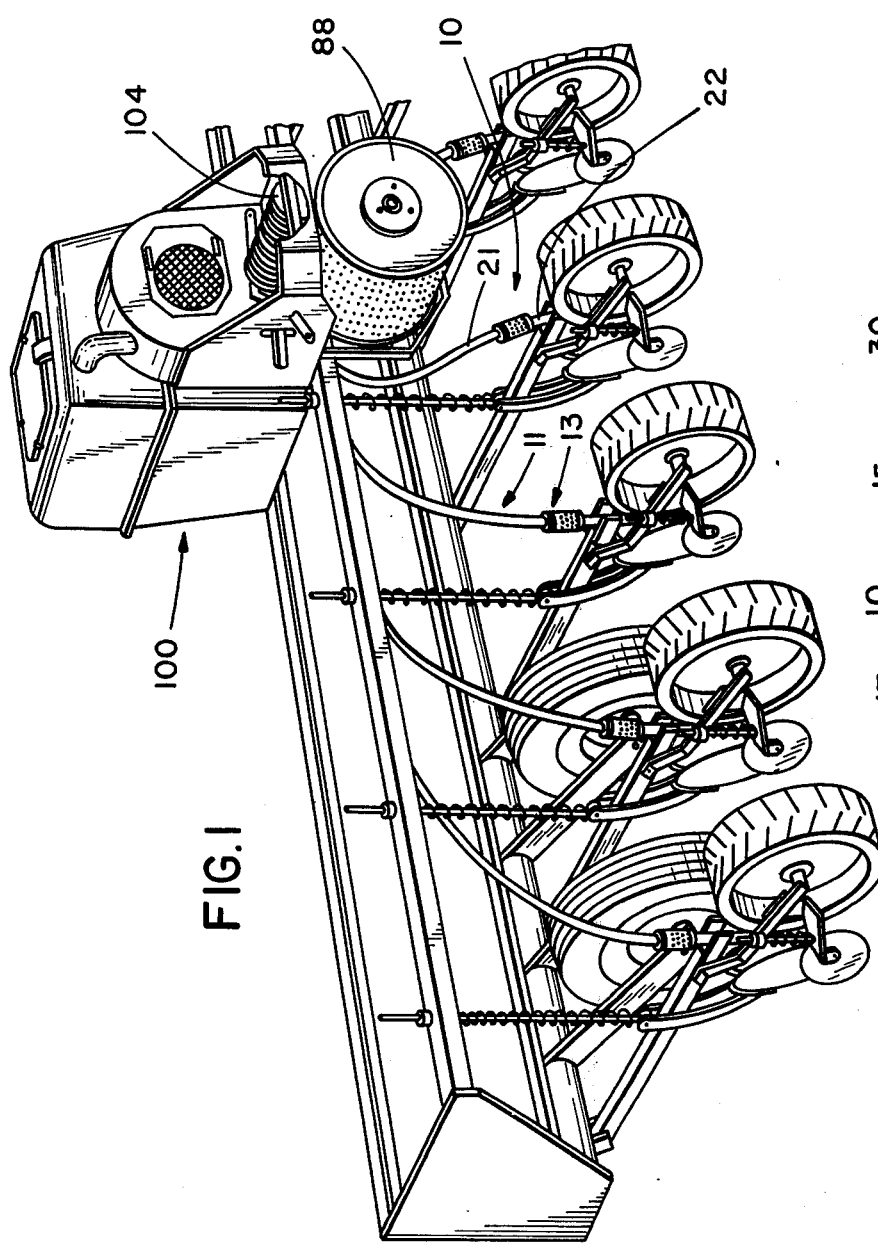
FIG. 1 is an illustration of a pneumatic seed planter with an air diffuser installed in each row unit seed delivery tube.

FIGS. 1 and 2 show an air diffuser 10 spliced into a cut seed delivery tube 11 upstream of a furrow opener 12 of a pneumatic planter 100. A pair of clamps 13 or other suitable clamping means secure the diffuser to two sections or upper and lower portions 21 and 22 of the delivery tube 11. It has been determined that the air diffuser can be installed in the lower portion 22 of the delivery tube between 25 to 50 inches from the discharge end 14 at the furrow opener 12. As shown in FIG. 4 and described in the related U.S. patent application Ser. No. 377,478 to Bauman et al filed on July 9, 1973, now U.S. Pat. No. 3,860,146, dated Jan. 14, 1975, seed 23 is uniformly deposited by drum 88 and rollers 104 into the intake end 103 of the seed tube 11 and is propelled or accelerated along the length of the tube by the force P of air. The furrow opener 12 (FIG. 2) creates a ditch for depositing each seed 23a as it drops from the seed discharge end 14 of the delivery tube. Should there be a blockage at the discharge end 14, the air in the delivery tube will buildup and create a back pressure $P_B$ which will act upon the seeds 23a traveling through tube. The back pressure $P_B$ will change the velocity of the seeds 23a so that the initial uniform spacing at the intake end 103 will vary as the seeds travel toward the bottom of the tube and are deposited into the ground. To prevent the buildup of back pressure, an air diffuser 10 is provided in the seed delivery tube 11 for venting the discharge end 14 of the tube 11 at the furrow opener 12.

Figure 3:
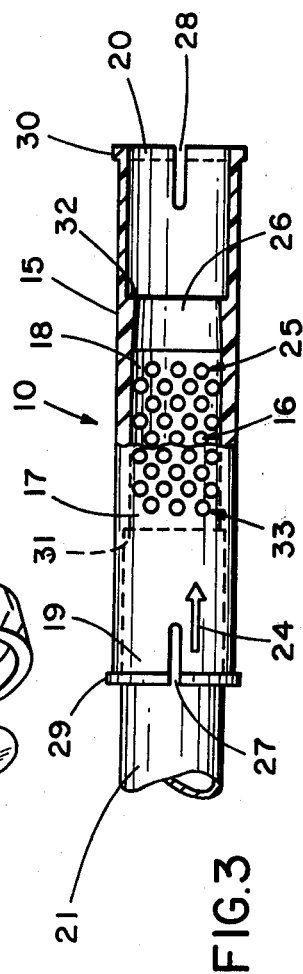
FIG. 3 is a partial cross-sectional side view of the air diffuser shown in FIGS. 1 and 2.

The air diffuser 10, shown in FIG. 3, comprises a cylindrical duct member 101 such as a pipe, tube or conduit. It is manufactured from any suitable material which may be used for transmitting air and solids. The body portion 15 is perforated with a plurality of holes 16 which are arranged in axially spaced-apart rows extending a predetermined distance axially along the body 15. The effective open area of the holes being approximately 50% greater than the open area within the duct member 101 taken on a cross section of the member at the location of the holes. In the preferred embodiment the holes are each approximately ⅛th inch in diameter and extend transversely through two quarter-round portions 17 and 18 of the body 15. The axes of the holes are on parallel planes forming a plurality of parallel axially spaced-apart rows of holes over an axial span from 1 to 1½ inches. The inside diameter along the span of holes is in the vicinity of ⅞ths of an inch. Also, in the preferred embodiment, there are an even number of rows of even numbered holes spaced between an odd number of rows of odd numbered holes on each quarter-round portion 17, 18. For example four rows of four holes each and five rows of three holes each for a total of 31 holes on each portion. Thus, the two quarters or quarter-round arcuate portions 17, 18 equal one-half of the circumference of the body portion 15 vented for a determinate axial length or span between 1 to 1½ inches which provides an effective vented area approximately 50% greater than the open area inside the body 15 taken on a cross-section within the span of rows of holes.

The body portion 15 has an air-seed inlet end 19 and an air-seed outlet end 20. Any suitable marking, such as arrow 24, is marked on the body portion 15 to indicate the direction of air-seed flow. Downstream of the last row of holes 25 there is a venturi portion 26 within the duct member 101 which increases the velocity of the air stream and aids in guiding the traveling seed 23a into the lower portion 22 of the seed delivery tube 11. Each end of the duct member 101 is provided with axially extending slots 27 and 28, annular external rings 29 and 30 at the edges of the ends and annular internal rings or shoulder portions 31 and 32 within the duct member 101 at the start or first row 31 of holes and at the downstream end of the venturi portion 26.

A pair of clamps 13 are placed over the slotted ends 19, 20 of the air diffuser 10 against the external rings 29, 30, the seed delivery tube 11 is cut at the distance previously specified, and the upper and lower cut portions 21, 22 are inserted into the duct member 101 up to the shoulder portions 31, 33. An adhesive or sealant may be applied to the cut ends 21, 22 prior to insertion into the duct member 101. The clamps 13 are then drawn tight against the slotted ends 19, 20 securing the cut ends 21 and 22 of the seed delivery tube 11 within the pipe 10. Should back pressure develop downstream of the diffuser 10, the back pressure will vent through the openings 15 and 16 and the seed 23a traveling in the lower portion 22 of the seed delivery tube downstream of the diffuser 10 will drop at a substantially uniform spacing proportional to the spacing at the time the seed was initially deposited into the intake end 103 of the tube.

The embodiments of the invention in which an exclusive property or privilege is claimed are defined as follows:

1. An air diffuser for use in a pressurized seed delivery tube of a pneumatic type of seed planter having the seed delivery tube connected to a ground furrow opener, the seed delivery tube being cut at a determinant length from the furrow opener and the air diffuser being spliced into the parted ends of the tube and secured thereto; the air diffuser comprising a short cylindrical duct member having a plurality of spaced-apart holes therethrough within a determined axial span, the effective open area of the holes being approximately 50% greater than an open area inside the duct member taken on a cross-section of the duct member within the span of holes; and
   wherein the duct member has an air-seed inlet end and an air-seed outlet end, the inlet end having an annular internal stepped portion forming a shoulder before the span of holes, and the outlet end having a venturi portion extending axially after the span of holes and forming a second shoulder, the parted ends of the tube being inserted into the inlet and outlet ends up to the shoulders.

2. An air diffuser as claimed in claim 1 wherein the inlet and outlet ends are provided with axially extending slots; and wherein clamping means are clamped over the slotted ends for securing the parted ends of the tube against the shoulders in the inlet and outlet ends.

3. An air diffuser for use in a pressurized seed delivery tube of a pneumatic type of seed planter having the seed delivery tube connected to a ground furrow opener, the seed delivery tube being cut at a determinant length from the furrow opener and the air diffuser being spliced into the parted ends of the tube and secured thereto; the air diffuser comprising a short cylindrical duct member having a plurality of spaced-apart holes therethrough within a determined axial span, the effective open area of the holes being approximately 50% greater than an open area inside the duct member taken on a cross-section of the duct member within the span of holes; and wherein the inside diameter at the cross-section is approximately seven times a hole diameter; and
   wherein the duct member has an air-seed inlet end and an air-seed outlet end, the inlet end having an annular internal stepped portion forming a shoulder before the span of holes, and the outlet end having a venturi portion extending axially after the span of holes and forming a second shoulder, the parted ends of the tube being inserted into the inlet and outlet ends up to the shoulders.

4. An air diffuser as claimed in claim 3 wherein the inlet and outlet ends are provided with axially extending slots; and wherein clamping means are clamped over the slotted ends for securing the parted ends against the shoulders in the inlet and outlet ends.

5. An air diffuser as claimed in claim 2 wherein the slotted ends are provided with raised ring portions and the clamping means are sleeved against the ring portions.

6. An air diffuser as claimed in claim 4 wherein the slotted ends are provided with raised ring portions and the clamping means are sleeved against the ring portions.

7. An air diffuser for use in a pressurized seed delivery tube of a pneumatic type of seed planter having the seed delivery tube connected to a ground furrow opener, the seed delivery tube being cut at a determinant length from the furrow opener and the air diffuser being spliced into the parted ends of the tube and secured thereto; the air diffuser comprising a short cylindrical duct member having a plurality of spaced-apart holes therethrough within a determined axial span, the effective open area of the holes being approximately 50% greater than an open area inside the duct member taken on a cross-section of the duct member within the span of holes; and
   wherein clamp means are provided over the ends of the duct member for securing the parted ends of the tube to the duct member; and wherein the ends are provided with axially extending slots and the clamp means are clamped over the slotted ends; and wherein the slotted ends are provided with raised ring portions and the clamp means are sleeved against the ring portions.

8. In a pneumatic type of seed planter having a pressurized seed delivery tube with a seed discharge end, wherein the improvement comprises:
   an air diffuser means spliced into the seed delivery tube for preventing a buildup of back pressure in the seed delivery tube upstream of seed discharge end and comprising an elongated tube having a plurality of apertures in a portion of the periphery thereof, the combined areas of the apertures providing an effective open area that is approximately 50% greater than a cross-sectional open area inside the tube taken on a plane passing through the apertured portion; and wherein each end of the tube is provided with an internal annular shoulder means for preventing the insertion of the seed delivery tube into the open area of the apertured portion; and wherein each end of the tube is provided with a slot means for clamping the seed delivery tube against the shoulders; and wherein the slotted ends of the tube are provided with an enlarged external ring means for limiting axial shifting of a clamping means sleeved over the slotted ends.

* * * * *